(12) United States Patent
Huang et al.

(10) Patent No.: US 7,230,406 B2
(45) Date of Patent: Jun. 12, 2007

(54) FIXED-FREQUENCY CURRENT MODE CONVERTER AND CONTROL METHOD THEREOF

(75) Inventors: Kent Huang, Taoyuan (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/210,812

(22) Filed: Aug. 25, 2005

(65) Prior Publication Data

US 2006/0043943 A1     Mar. 2, 2006

(30) Foreign Application Priority Data

Aug. 26, 2004 (TW) .............................. 93125507 A

(51) Int. Cl.
*G05F 1/00* (2006.01)
(52) U.S. Cl. ..................... 323/222; 323/284; 323/286
(58) Field of Classification Search ................ 323/222, 323/282, 284, 286, 285
See application file for complete search history.

(56) References Cited

U.S. PATENT DOCUMENTS

| | | | | |
|---|---|---|---|---|
| 5,568,044 A | * | 10/1996 | Bittner | ................... 323/272 |
| 6,215,290 B1 | * | 4/2001 | Yang et al. | ................... 323/282 |
| 6,232,755 B1 | * | 5/2001 | Zhang | ................... 323/282 |
| 6,288,524 B1 | * | 9/2001 | Tsujimoto | ................... 323/285 |
| 6,377,032 B1 | * | 4/2002 | Andruzzi et al. | ........... 323/224 |
| 6,404,175 B1 | * | 6/2002 | Yang et al. | ................... 323/282 |
| 6,465,993 B1 | * | 10/2002 | Clarkin et al. | ............. 323/272 |
| 7,030,596 B1 | * | 4/2006 | Salerno et al. | ............. 323/282 |
| 7,031,174 B2 | * | 4/2006 | Lipcsei | ...................... 363/98 |
| 7,042,203 B2 | * | 5/2006 | Van Der Horn et al. | .... 323/285 |

* cited by examiner

*Primary Examiner*—Bao Q. Vu
(74) *Attorney, Agent, or Firm*—Rosenberg, Klein & Lee

(57) ABSTRACT

A fixed-frequency current mode converter comprises a power stage to produce an inductor current and an output voltage, an error amplifier to generate an error signal from the difference between the output voltage and a reference voltage varied with the inductor current, a comparator to compare the error signal with a ramp signal varied with the inductor current to generate a comparison signal, and a PWM generator to generate a PWM signal in response to a fixed-frequency clock and the comparison signal to drive the power stage. A second comparator is further comprised to compare the error signal with a second reference voltage varied with the inductor current, and generates a second comparison signal to reset the clock when the error signal is lower than the second reference voltage.

20 Claims, 7 Drawing Sheets

FIXED-FREQUENCY CURRENT MODE CONVERTER AND CONTROL METHOD THEREOF

FIELD OF THE INVENTION

The present invention is related generally to a current mode converter and more particularly to a fixed-frequency current mode converter.

BACKGROUND OF THE INVENTION

In a current mode converter, typically, the output voltage is generated by alternatively switching a pair of high side and low side switches coupled between an input voltage and ground to produce an output current to charge an output capacitor. To reduce the influence to load transient resulted from the equivalent series resistance (ESR) of the output capacitor, voltage droop function is generally employed. To illustrate the voltage droop tuning, FIG. 1 schematically shows the waveforms of the output voltages of a current mode converter with and without voltage droop function in a load transient, in which waveform 100 represents the output voltage of a current mode converter without voltage droop function in a load transient, and waveform 102 represents the output voltage of a current mode converter having voltage droop function in a load transient. As shown at time T1, when load changes from light to heavy, the output voltage of a converter without voltage droop function instantly drops ΔV and then recovers to the original level, as depicted by portion 104, while the output voltage of a converter having voltage droop function instantly drops ΔV and then maintains at the lower level, as depicted by portion 106. Until the load changes from heavy back to light at time T2, the output voltage of the converter without voltage droop function instantly jumps ΔV and then recovers to the original level, as depicted by portion 108, while the output voltage of the converter having voltage droop function recovers from the lower level to the original level, as depicted by portion 110. In this figure, Vmax denotes the maximum voltage the converter could generate, and Vmin denotes the minimum voltage the converter could generate, and during load transient, i.e., from time T1 to T2, $\Delta V_{C,ESR,1}$ is the tolerance for the output voltage of the converter without voltage droop function available for the influence resulted from the equivalent series resistance of the output capacitor, and $\Delta V_{C,ESR,2}$ is the tolerance for the output voltage of the converter having voltage droop function available for the influence resulted from the equivalent series resistance of the output capacitor. Since $\Delta V_{C,ESR,1}$ is smaller than $\Delta V_{C,ESR,2}$, a converter without voltage droop function needs more output capacitors to reduce the influence to the output voltage resulted from the equivalent series resistance of the output capacitor than a converter having voltage droop function. Accordingly, converter having voltage droop function is superior in cost.

Moreover, for faster response to load transient, a conventional current mode converter is operated with varying frequency implemented with hysteretic control. Unfortunately, the control for such operation with varying frequency is much more complicated than that of fixed-frequency operation. On the other hand, in a multi-phase converter, for balancing the inductor currents between all phases, all the inductor currents in the phases are summed and averaged for control, thereby requesting additional circuitry for the summation and averaging operations. As a result, the complexity and cost of the system increase.

Accordingly, it is desired a fixed-frequency current mode converter, which has voltage droop function and faster response to load transient, and achieves inductor current balance between all phases without additional circuitry.

SUMMARY OF THE INVENTION

One object of the present invention is to provide a fixed-frequency current mode converter having voltage droop function.

Another object of the present invention is to provide a fixed-frequency current mode converter having faster response to load transient.

Yet another object of the present invention is to provide a fixed-frequency current mode converter capable of automatically balancing the inductor currents between all the phases thereof.

In a single-phase fixed-frequency current mode converter comprising a power stage to produce an inductor current and an output voltage, according to the present invention, a current sense circuit senses the inductor current to generate a first current sense signal and a second current sense signal, a reference voltage generator generates a reference voltage varied with the inductor current by using the first current sense signal, an error amplifier generates an error signal from the difference between the output voltage and reference voltage to supply to a comparator, a ramp generator generates a ramp signal varied with the inductor current by using the second current sense signal, the comparator compares the error signal with the ramp signal to generate a comparison signal, a clock generator generates a fixed-frequency clock, and a pulse width modulation (PWM) generator generates a PWM signal in response to the clock and comparison signal for driving the power stage. The clock determines the rising edge of the PWM signal, and the comparison signal determines the falling edge of the PWM signal. In an embodiment, the current sense circuit comprises a transconductive amplifier to sense the inductor current to produce a third current sense signal, a sample and hold circuit to sample and hold the third current sense signal to produce the first current sense signal, and another sample circuit to sample the third current sense signal to produce the second current sense signal. To achieve faster response to load transient, a second reference voltage generator generates a second reference voltage varied with the inductor current, a second comparator compares the error signal with the second reference voltage for generating a second comparison signal, and once the error signal is lower than the second reference voltage, the second comparison signal will force the fixed-frequency clock generator to reset the fixed-frequency clock.

According to the present invention, in a multi-phase fixed-frequency current mode converter, each phase has a power stage to produce an inductor current, all the power stages are coupled to a common output to produce an output voltage, each phase has a current sense circuit to sense the inductor current thereof to generate a first current sense signal and a second current sense signal, a reference voltage generator generates a reference voltage varied with the summation of all the inductor currents by using the first current sense signals, an error amplifier generates an error signal from the difference between the output voltage and reference voltage, each phase has a ramp generator to generate a ramp signal varied with the inductor current thereof by using the respective second current sense signal, and a comparator to compare the error signal with the respective ramp signal to generate a comparison signal, a clock generator generates a plurality of fixed-frequency clocks each for one of the phases, and each phase has a PWM generator to generate a PWM signal in response to the respective clock and comparison signal for driving the power stage thereof.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
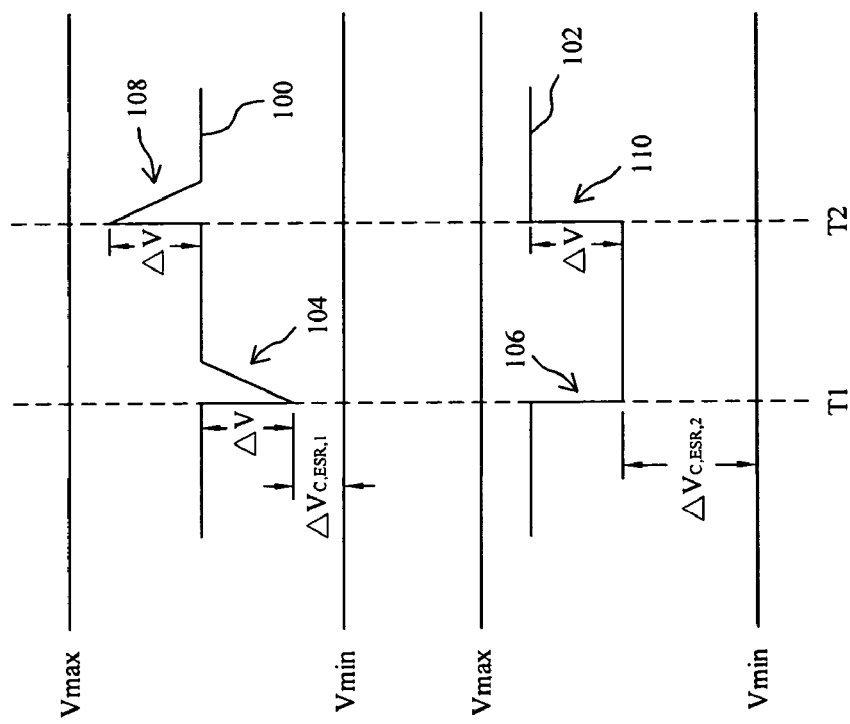
FIG. 1 schematically shows the waveforms of the output voltages of a current mode converter with and without voltage droop function in a load transient.
Figure 2:
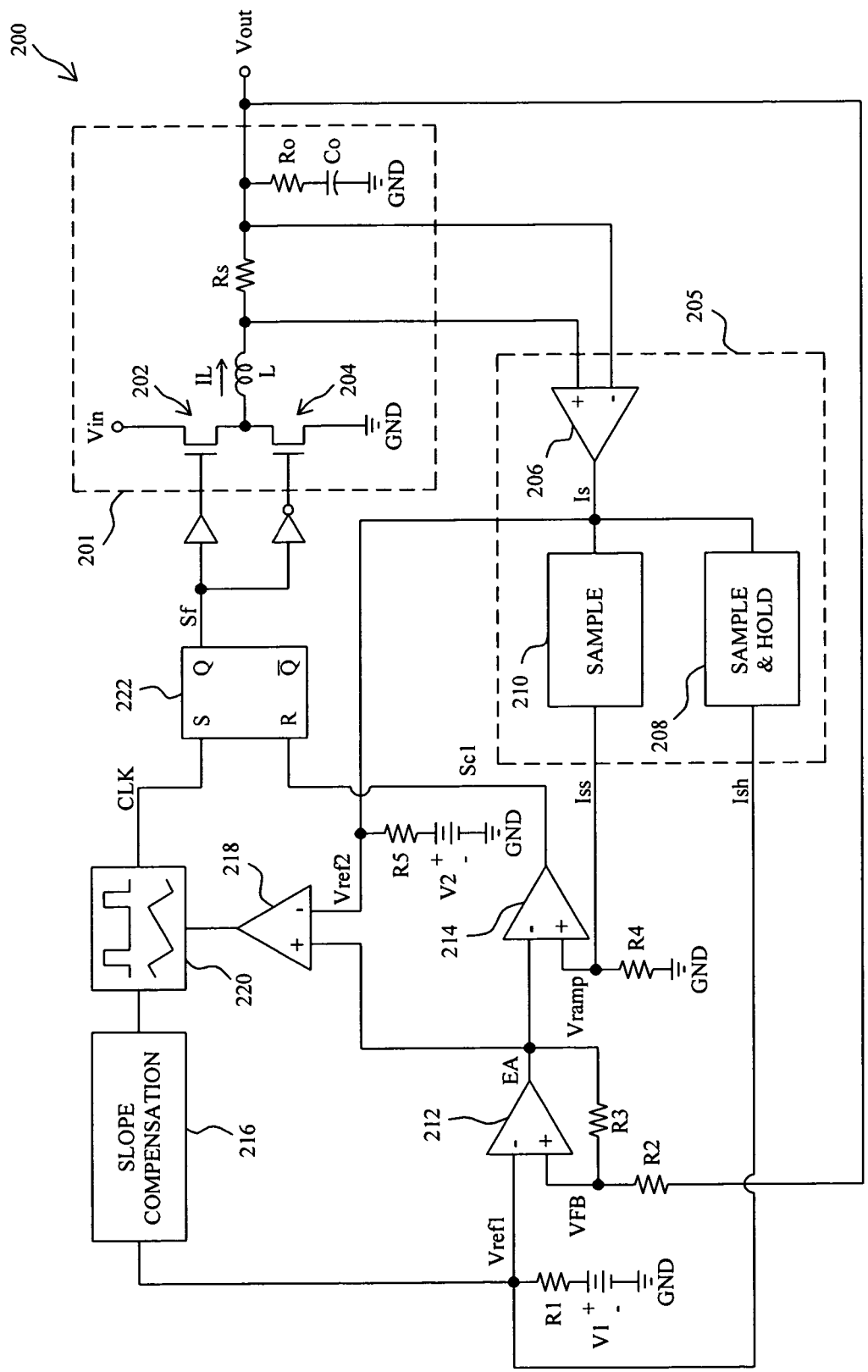
FIG. 2 shows a single-phase fixed-frequency current mode converter according to the present invention.

FIG. 2 shows a single-phase fixed-frequency current mode converter 200, in which power stage 201 includes a high side transistor 202 and a low side transistor 204 coupled in series between input voltage Vin and ground GND to be alternatively switched to produce an inductor current IL flowing through an inductor L to charge an output capacitor Co to produce output voltage Vout, current sense circuit 205 includes a transconductive amplifier 206 having its two inputs coupled to the two ends of a sense resistor Rs coupled in series to the inductor L to sense the inductor current IL to generate a current sense signal Is, sample and hold circuit 208 samples and holds the current sense signal Is to generate a current sense signal Ish, sample circuit 210 samples the current sense signal Is to generate a current sense signal Iss, resistor R1 and voltage source V1 constitute a reference voltage generator to generate a reference voltage Vref1 varied with the inductor current IL by using the current sense signal Ish, slope compensation unit 216 is coupled between the reference voltage Vref1 and clock generator 220 to improve the system stability of the converter 200, error amplifier 212 generates an error signal EA from the difference between the reference voltage Vref1 and a feedback signal VFB produced proportionally to the output voltage Vout, resistor R4 serves as a ramp generator to generate a ramp signal Vramp varied with the inductor current IL by using the current sense signal Iss, comparator 214 compares the error signal EA with the ramp signal Vramp to produce a comparison signal Sc1 coupled to the reset input R of RS latch 222, the RS latch 222 has its set input S receiving a fixed-frequency clock CLK generated by the clock generator 220, the RS latch 222 produces a PWM signal Sf in response to the clock CLK and comparison signal Sc1 to switch the transistor 202 and 204. With the RS latch 222 serving as a PWM generator, the clock CLK determines the rising edge of the PWM signal Sf, and the comparison signal Sc1 determines the falling edge of the PWM signal Sf. In addition, to achieve faster response to load transient, resistor R5 and voltage source V2 constitute a reference voltage generator to generate a reference voltage Vref2 varied with the inductor current IL by using the current sense signal Is, and comparator 218 compares the error signal EA with the reference voltage Vref2 to generate a comparison signal for the clock generator 220. Once the error signal EA is lower than the second reference voltage Vref2, the comparison signal produced by the comparator 218 will force the clock generator 220 to reset the clock CLK. When the load on the output Vout changes from light to heavy to cause the reference voltage Vref2 greater than the error signal EA, the comparator 218 forces the clock generator 220 to reset the clock CLK, and the transistor 202 is instantly turned on eventually, i.e., the load transient is fast responded. There is no need of frequency compensation circuit to stable the converter 200, and therefore the response speed is further enhanced.

Figure 3:
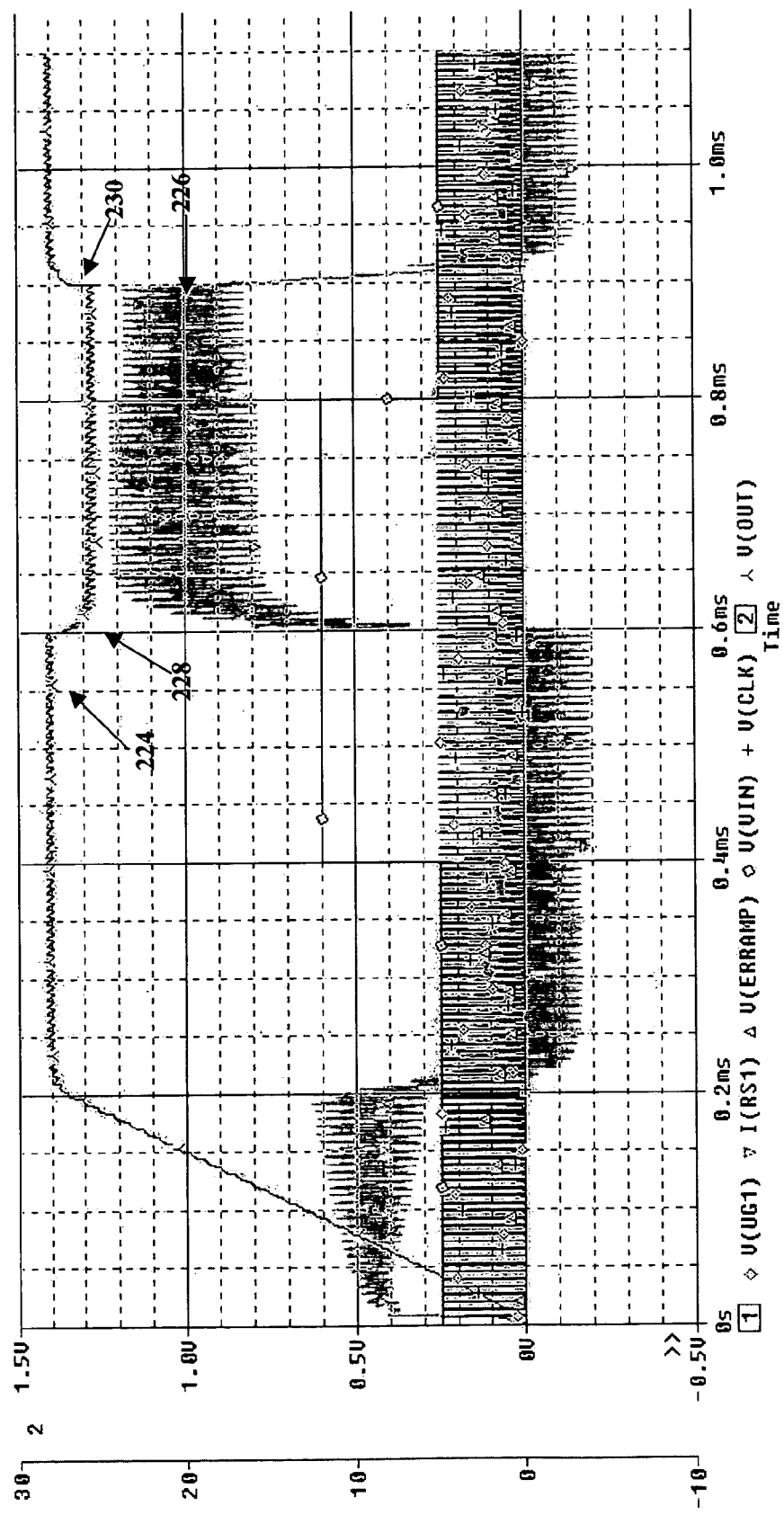
FIG. 3 shows a simulation result of the output voltage and inductor current of the converter shown in FIG. 2.

FIG. 3 shows a simulation result for the converter 200, in which waveform 224 represents the output voltage Vout, and waveform 226 represents the inductor current IL. Since the reference voltage Vref1 for the error amplifier 212 and the ramp signal Vramp for the comparator 214 both vary with the inductor current IL, the output voltage Vout will decrease when the inductor current IL increases in response to the change of load from light to heavy, maintain at the lower level until load changes from heavy back to light, and then recover to the original level, as depicted from portions 228 to 230 in the waveform 224.

Figure 4:
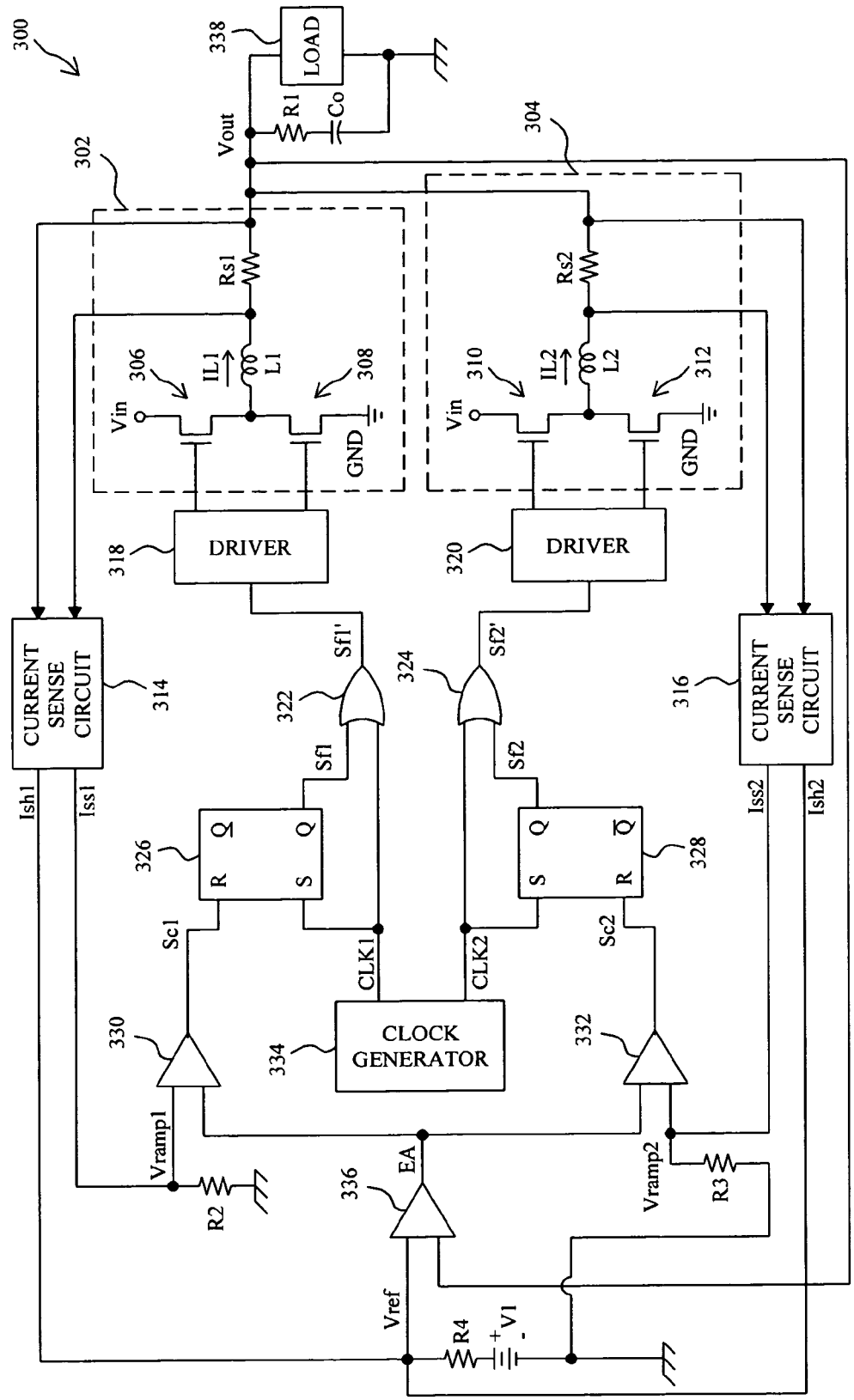
FIG. 4 shows a two-phase fixed-frequency current mode converter according to the present invention.

FIG. 4 shows a two-phase fixed-frequency current mode converter 300, in which one phase includes power stage 302 having transistors 306 and 308 coupled in series between input voltage Vin and ground GND, and driver 318 for alternatively switching the transistors 306 and 308 to produce an inductor current IL1, another phase includes power stage 304 having transistors 310 and 312 coupled in series between input voltage Vin and ground GND, and driver 320 for alternatively switching the transistors 310 and 312 to produce an inductor current IL2, the power stages 302 and 304 are coupled to common output Vout such that the inductor currents IL1 and 112 in the two phases flow through inductors L1 and L2 respectively to charge output capacitor Co to produce output voltage Vout, the two phases have current sense circuits 314 and 316 for sensing the inductor currents IL1 and 112 thereof respectively by sensing the voltage drops across sense resistors Rs1 and Rs2 coupled in series to the inductors L1 and L2 to produce current sense signals Ish1 and Iss1 for the first phase and Ish2 and Iss2 for the second phase, resistor R4 and voltage source V1 constitute a reference voltage generator to generate a reference voltage Vref varied with the inductor currents IL1 and 112 by using the current sense signals Ish1 and Ish2, error amplifier 336 generates an error signal EA from the difference between the output voltage Vout and reference voltage Vref, resistors R2 and R3 serve as ramp generators for the two phases respectively to produce ramp signals Vramp1 and Vramp2 by using the current sense signals Iss1 and Iss2, comparators 330 and 332 compare the error signal EA with the ramp signals Vramp1 and Vramp2 for respective phases to produce comparison signals Sc1 and Sc2, RS latch 326 in the first phase has its reset input R receiving the comparison signal Sc1 and set input S receiving a fixed-frequency clock CLK1 supplied by clock generator 334 to produce PWM signal Sf1, for preventing from double pulses in the PWM signal, OR gate 322 is further inserted to receive the PWM signal Sf1 and clock CLK1 to produce PWM signal SF1' for the driver 318 to switch the transistors 306 and 308, RS latch 328 in the other phase has its reset input R receiving the comparison signal Sc2 and set input S receiving a fixed-frequency clock CLK2 supplied by the clock generator 334 to produce PWM signal Sf2, OR gate 324 is further inserted to receive the PWM signal Sf2 and clock CLK2 to produce PWM signal Sf2' for the driver 320 to switch the transistors 310 and 312. With the RS latch 326 serving as PWM generator for the first phase, the clock CLK1 determines the rising edge of the PWM signal Sf1', and the comparison signal Sc1 determines the falling edge of the PWM signal Sf1'. For the second phase, likewise, the clock CLK2 determines the rising edge of the PWM signal Sf2', and the comparison signal Sc2 determines the falling edge of the PWM signal Sf2'. The clock generator 334 also functions for phase splitting. It is not shown in this embodiment, however, the current sense circuit 205 shown in FIG. 2 may be applied for the current sense circuits 314 and 316 hereof, to produce the current sense signals Ish1, Iss1, Ish2 and Iss2.

In the converter 300, since only an error amplifier 336 is used, and both the current sense signals Ish1 and Ish2 are coupled to the reference voltage generator composed of the resistor R4 and voltage source V1 to generate the reference voltage Vref for the error amplifier 336, if the resistances of the resistors R2 and R3 for the ramp generators are equal to each other, the inductor currents IL1 and IL2 will be automatically balanced with no need of additional circuit. Alternatively, if it is desired unbalanced inductor currents IL1 and IL2 between the two phases, it may be accomplished by adjusting the resistances of the resistors R2 and R3 to change the inductor currents IL1 and IL2. Since the reference voltage Vref and ramp signals Vramp1 and Vramp2 all vary with the inductor currents IL1 and IL2, the converter 300 may achieve voltage droop function as load 338 changes from light to heavy. For faster response to load transient, reference voltage generators may be added in the converter 300 to generate reference voltages varied with the inductor currents IL1 and IL2 for comparators to compare with the error signal EA to force the clock generator 334 to rest the clocks CLK1 and CLK2 when the reference voltages are greater than the error signal EA, as the converter 200 of FIG. 2 does.

Figure 5:
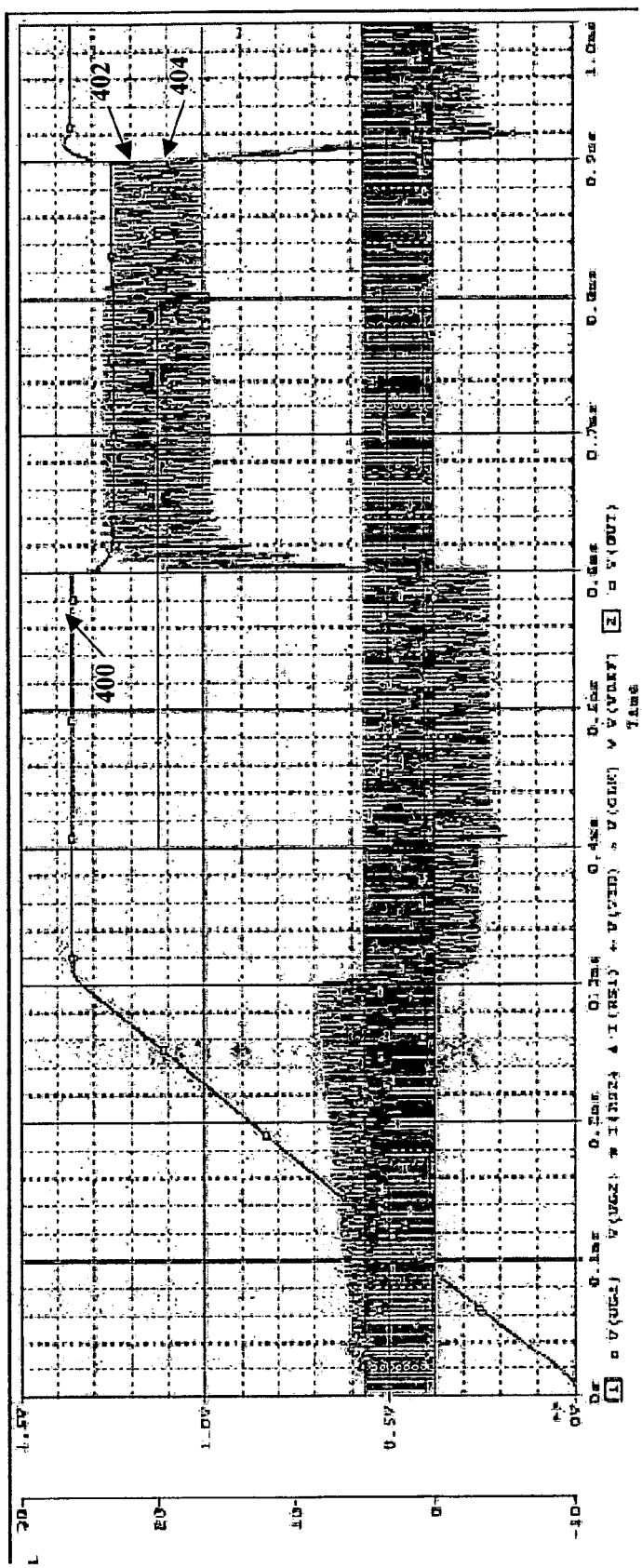
FIG. 5 shows a simulation result of the output voltage and inductor currents of the converter shown in FIG. 4.
Figure 6:
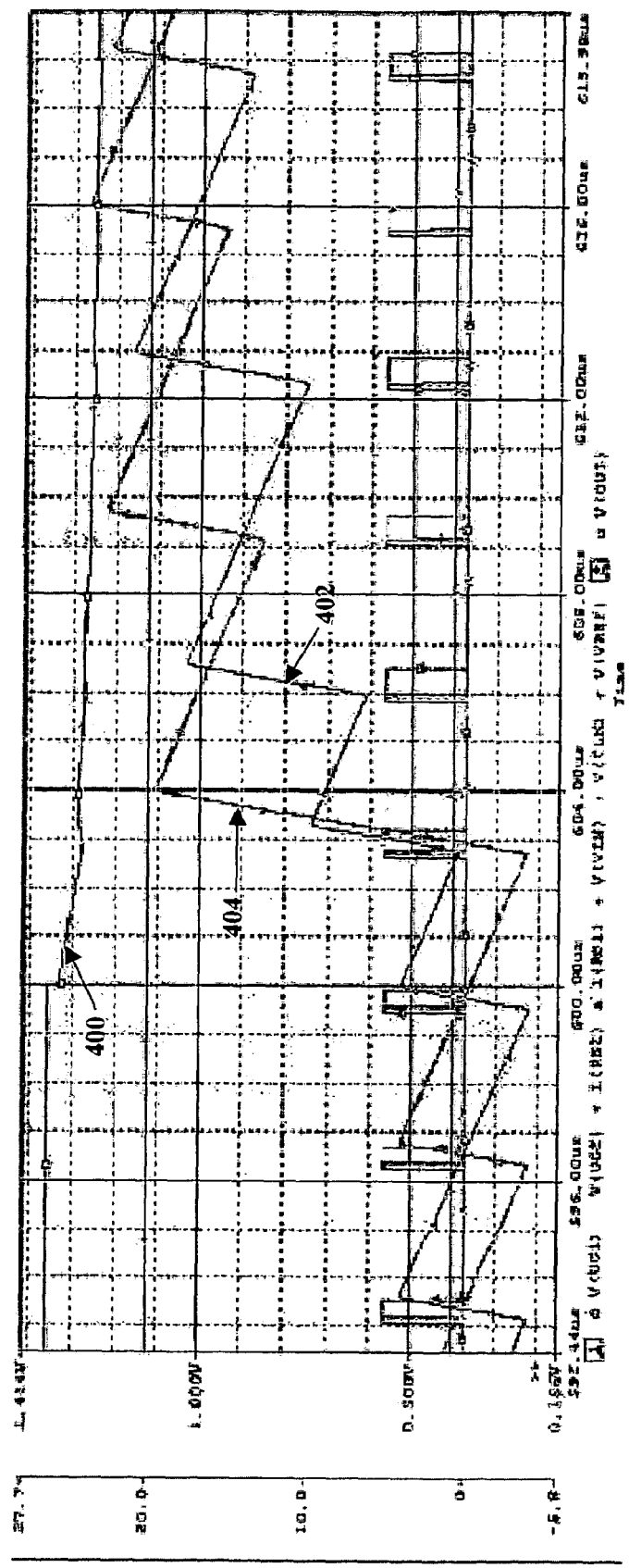
FIG. 6 shows an enlarged portion of the waveform shown in FIG. 5.
Figure 7:
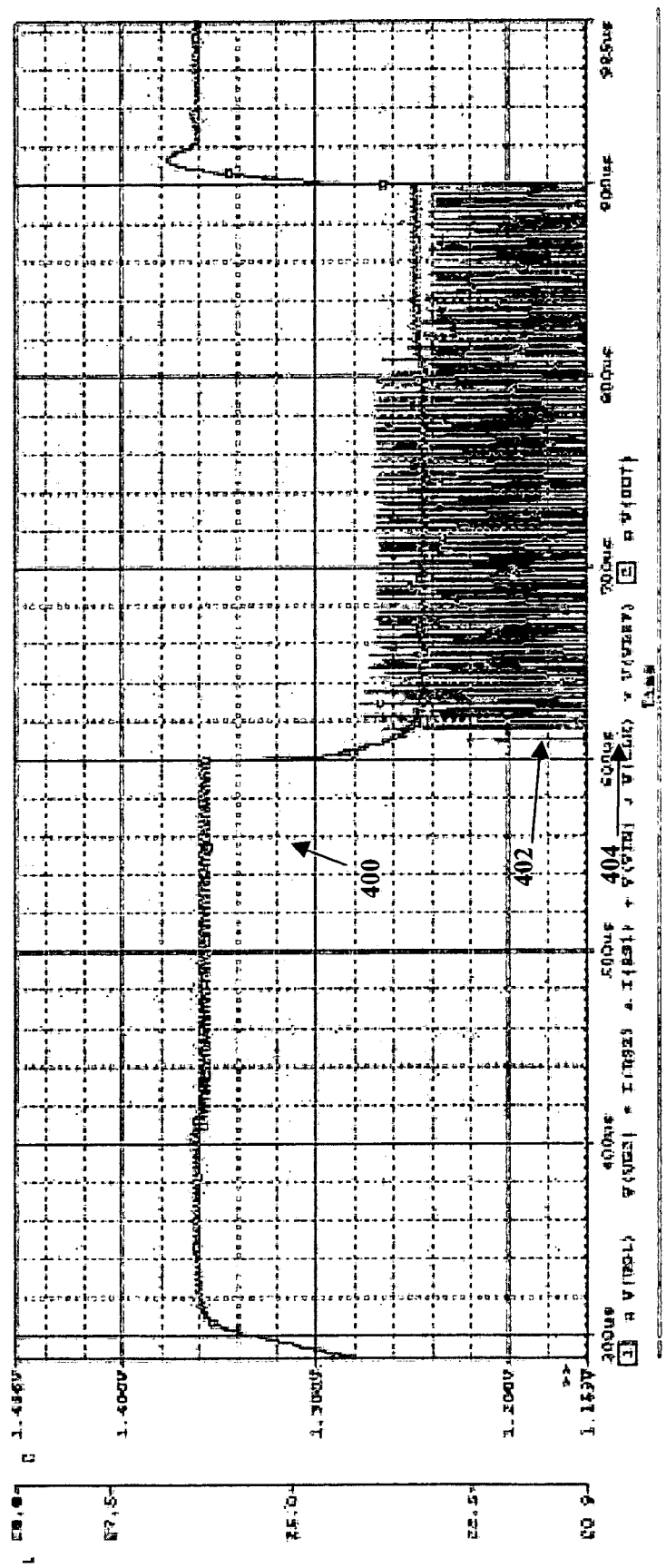
FIG. 7 shows another enlarged portion of the waveform shown in FIG. 5.

FIG. 5 shows a simulation result for the converter 300, and FIGS. 6 and 7 show enlarged portions of the waveforms shown in FIG. 5. In FIGS. 5 and 7, waveform 400 represents the output voltage Vout, waveform 402 represents the inductor current IL1 of the first phase, and waveform 404 represents the inductor current IL2 of the second phase. At time 0.6 ms, i.e., 600 μs shown in the figures, the load 338 on the converter 300 changes from light to heavy, and the output voltage Vout drops down and maintains at that lower level, as shown by the waveform 400, which illustrates the voltage droop function of the converter 300. In FIG. 6, the load 338 changes from light to heavy at time 600 μs, and the converter 300 responds thereto at around time 603.7 μs by having the inductor currents IL1 and IL2 increased, as shown by the waveforms 402 and 404, which illustrates the fast response capability of the converter 300.

As shown by the above embodiments, single-phase and multi-phase converters having voltage droop function may operate with fixed-frequency, and for multi-phase converter, it may automatically balance the inductor currents between the phases thereof without circuitry of summing and averaging operations. It is therefore to implement a converter having superior performance and of low-cost.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:
1. A fixed-frequency current mode converter comprising:
a power stage for producing an inductor current and an output voltage;
an error amplifier for generating an error signal from a difference between the output voltage and a reference voltage varied with the inductor current produced by the power stage;
a comparator coupled to receive an output of the error amplifier for comparing the error signal with a ramp signal varied with the inductor current to generate a comparison signal;
a clock generator for providing a fixed-frequency clock; and
a PWM generator in response to the clock and comparison signal for generating a PWM signal to drive the power stage.

2. The converter of claim 1, further comprising:
a current sense circuit for sensing the inductor current to generate a first current sense signal and a second current sense signal;
a reference voltage generator for generating the reference voltage based on the first current sense signal; and
a ramp generator for generating the ramp signal based on the second current sense signal.

3. The converter of claim 2, wherein the current sense circuit comprises;
a transconductive amplifier for sensing the inductor current to generate a third current sense signal;
a sample and hold circuit for sampling and holding the third current sense signal to generate the first current sense signal; and
a sample circuit for sampling the third current sense signal to generate the second current sense signal.

4. The converter of claim 1, further comprising:
a second reference voltage varied with the inductor current; and
a second comparator for comparing the error signal with the second reference voltage to generate a second comparison signal to force the clock generator to reset the fixed-frequency clock when the error signal is lower than the second reference voltage.

5. The converter of claim 1, further comprising a slope compensation unit coupled between the reference voltage and clock generator for improving stability of the converter.

6. The converter of claim 1, wherein the PWM generator comprises an RS latch having a set input coupled with the clock, a reset input coupled with the comparison signal, and an output for generating the PWM signal.

7. A control method for a fixed-frequency current mode converter including a power stage to produce an inductor current and an output voltage, the method comprising the steps of;
(a) generating an error signal from a difference between the output voltage and a reference voltage varied with the inductor current produced by the power stage;
(b) receiving from an output of an error amplifier and comparing the error signal with a ramp signal varied with the inductor current for generating a comparison signal;
(c) supplying a fixed-frequency clock by a clock generator; and
(d) generating a PWM signal in response to the clock and comparison signal for driving the power stage, wherein the clock determines rising edge of the PWM signal and the comparison signal determines falling edge of the PWM signal.

8. The method of claim 7, further comprising the steps of:
(e) sensing the inductor current for generating a first current sense signal and a second current sense signal;
(f) generating the reference voltage based on the first current sense signal; and
(g) generating the ramp signal based on the second current sense signal.

9. The method of claim 8, wherein the step (e) comprises the steps of:
sensing the inductor current for generating a third current sense signal;
sampling and holding the third current sense signal for generating the first current sense signal; and
sampling the third current sense signal for generating the second current sense signal.

10. The method of claim 7, further comprising the steps of:
generating a second reference voltage varied with the inductor current; and
comparing the error signal with the second reference voltage for generating a second comparison signal to force the clock generator to reset the clock when the error signal is lower than the second reference voltage.

11. A fixed-frequency current mode convener comprising:
a plurality of power stages each for one phase to produce an inductor current, the plurality of power stages coupled to a common output to produce an output voltage;
an error amplifier for generating an error signal from a difference between the output voltage and a reference voltage varied with a summation of the plurality of inductor currents produced by the vower stages;
a plurality of comparators each coupled to receive an output of the error amplifier for comparing the error signal with a respective ramp signal varied with one of the plurality of inductor currents to generate a comparison signal for the respective phase;
a clock generator for providing a plurality of fixed-frequency clocks each for one of the plurality of phases; and
a plurality of PWM generators each in response to one of the plurality of clocks and one of the plurality of comparison signal in one of the plurality of phases for generating a PWM signal to drive the power stage of the respective phase.

12. The converter of claim 11, further comprising:
a plurality of current sense circuits each for sensing one of the plurality of inductor currents to generate a first current sense signal and a second current sense signal for one respective phase;
a reference voltage generator for generating the reference voltage based on the plurality of first current sense signals; and
a plurality of ramp generators each for generating one of the plurality of ramp signals based on one of the plurality of second current sense signals.

13. The converter of claim 12, wherein each of the plurality of current sense circuits comprises:
a transconductive amplifier for sensing the respective inductor current to generate a third current sense signal;
a sample and hold circuit for sampling and holding the third current sense signal to generate the respective first current sense signal; and
a sample circuit for sampling the third current sense signal to generate the respective second current sense signal.

14. The converter of claim 11, wherein each of the plurality of PWM generators comprises:
an RS latch having a set input coupled with the respective clock, a reset input coupled with the respective comparison signal, and an output for generating a second PWM signal for the respective phase; and
an OR gate for receiving the respective clock and second PWM signal to generate the first PWM signal accordingly.

15. The converter of claim 11, wherein each of the phases further comprises:
a second reference voltage generator for generating a second reference voltage varied with the respective inductor current; and
a second comparator for comparing the error signal with the second reference voltage to generate a second comparison signal to force the clock generator to reset the respective clock when the error signal is lower than the second reference voltage.

16. A control method for a fixed-frequency current mode converter including a plurality of power stages each for one phase to produce an inductor current, the plurality of power stages coupled to a common output to produce an output voltage, the method comprising the steps of:
(a) generating an error signal from a difference between the output voltage and a reference voltage varied with a summation of the plurality of inductor currents produced by the power stages;
(b) generating a plurality of ramp signals each varied with one of the plurality of inductor currents;
(c) receiving from an output of an error amplifier and comparing the error signal with each of the plurality of ramp signals for generating a plurality of comparison signals;
(d) supplying a plurality of fixed-frequency clocks by a clock generator; and
(e) generating a plurality of PWM signals each in response to one of the plurality of clocks and one of the plurality of comparison signals in the respective phase to drive the respective power stage thereof.

17. The method of claim 16, further comprising the steps of:
(f) sensing the plurality of inductor currents each for generating a first current sense signal and a second current sense signal;
(g) generating the reference voltage based on the plurality of first current sense signals; and
(h) generating the plurality of ramp signals each based on one of the plurality of second current sense signals for the respective phase.

18. The method of claim 17, wherein the step (f) comprises the steps of:
sensing each of the plurality of inductor currents for generating a plurality of third current sense signals;
sampling and holding each of the plurality of third current sense signals for generating the plurality of first current sense signals; and
sampling each of the plurality of third current sense signals for generating the plurality of second current sense signals.

19. The method of claim 16, wherein the step (e) comprises the steps of:
for each phase generating a second PWM signal in response to the respective clock and comparison signal; and
generating the respective first PWM signal by OR-gating the respective second PWM signal and clock.

20. The method of claim 16, further comprising the steps of:
for each phase generating a second reference voltage varied with the respective inductor current; and
comparing the error signal with the second reference voltage for generating a second comparison signal for the respective phase to force the clock generator to rest the respective clock thereof when the error signal is lower than the respective second reference voltage.

* * * * *